United States Patent [19]

de Bellis et al.

[11] Patent Number: 4,480,018

[45] Date of Patent: Oct. 30, 1984

[54] SEALED FEED-THROUGH FOR A WALL IN AN ALKALINE BATTERY

[75] Inventors: Laurent de Bellis, Le Bouscat; Raymond Prokopp, Bordeaux, both of France

[73] Assignee: Societe Anonyme dite SAFT, Romainville, France

[21] Appl. No.: 532,063

[22] Filed: Sep. 14, 1983

[30] Foreign Application Priority Data

Sep. 23, 1982 [FR] France .............................. 82 16017

[51] Int. Cl.³ .............................................. H01M 2/24
[52] U.S. Cl. ..................................... 429/160; 429/185
[58] Field of Search ............... 429/160, 149, 123, 158, 429/174, 185

[56] References Cited

U.S. PATENT DOCUMENTS 3,336,164  8/1967  Miller .................................... 429/160
3,347,709  10/1967 Taylor et al. ........................ 429/160
3,484,299  12/1969 Nyberg et al. ....................... 429/160
3,844,841  10/1974 Baker ................................ 429/160 X Primary Examiner—Anthony Skapars
Attorney, Agent, or Firm—Kenyon & Kenyon

[57] ABSTRACT

The sealed feed-through (1) interconnects two cells of an alkaline storage battery (eg. for an electrically propelled car) by passing through a wall (2) of the battery. The battery includes a monobloc casing of plastic material defining at least two battery cell compartments which are separated by said wall, and said wall has an orifice for receiving the feed-through. The feed-through comprises a first portion (10) for electrical connection to electrodes (7) of a first polarity in a first one of the cells and a second portion (20) for electrical connection to electrodes (7') of opposite polarity in the other cell. In an alkaline battery, conventional welding techniques for making such feed-throughs in lead-acid batteries are not applicable because metals such as nickel steel must be used instead of lead. The resulting welding temperature would destroy the plastic wall. Instead, the first and second portions include interfitting male and female portions (11 and 21) suitable for passing through said orifice from opposite sides thereof and for engaging each other in a force fit. Respective skirts surround said interfitting portions and serve to compress at least one deformable sealing member (30) around the orifice. Stops are provided to prevent the wall being crushed when the feed-through portions are forced together.

5 Claims, 6 Drawing Figures

SEALED FEED-THROUGH FOR A WALL IN AN ALKALINE BATTERY

The present invention relates to a sealed feed-through for electrically interconnecting two cells in an alkaline storage battery by passing through a wall separating the cells.

BACKGROUND OF THE INVENTION

Current designs for electrically-propelled motor cars use batteries of storage cells based on the nickel-iron couple. This couple provides cells that deliver 1.2 volts each, and such cells are grouped in blocks of five to constitute alkaline battery units that deliver 6 volts. Such units are generally in the form of a monobloc casing having five cell compartments separated by four inter-cell partition walls, with four electrical connections connecting the five cells in series. In order to reduce the overall height of the battey units, it is desireable to provide these connections below the level of the battery electrolyte, which means that the connections must pass through the partitions in a sealed manner.

Lead storage batteries are known in which electrical connections are made by means of sealed feed-throughs passing through partition walls below the level of the electrolyte. Each feed-through is made by welding together two current collectors from a pair of adjacent cells via an orifice in the partition wall separating the cells. all the other parts of the feed-through are also made of lead, so the welding operation is performed at a relatively low temperature.

In alkaline storage batteries, it is essential to use harder metals (eg. nickel steel) for which conventional welding techniques require the use of relatively high temperatures that burn and damage the partition wall material.

Preferred embodiments of the present invention enable this drawback to be avoided by providing a feed-through which does not require welding.

Such embodiments also have other advantages such as an appreciable saving in weight, low manufacturing cost, and simple design, all of which contribute to making electrically-propelled vehicles more accessible to the general public.

SUMMARY OF THE INVENTION

The present invention provides a sealed feed-through for interconnecting two cells of an alkaline storage battery by passing through a wall of said battery in a sealed manner, said battery including a monobloc casing of plastic material defining at least two battery cell compartments which are separated by said wall, said wall having an orifice for receiving said feed-through; said feed-through comprising:

a first portion for electrical connection to electrodes of a first polarity in a first of said two cells to be interconnected by means of the feed-through; and a second portion for electrical connection to electrodes of a second, opposite, polarity in the second of said two cells to be interconnected by means of the feed-through;

the improvement wherein said first and second portions include interfitting male and female portions suitable for passing through said orifice from opposite sides thereof and for engaging each other in a force fit;

wherein said first and second portions further include respective skirts surrounding said interfitting portions and serving to compress at least one deformable sealing member around said orifice; and wherein said first and second portions include interacting abutment surfaces to define a fully-home position in which the portions are prevented from moving into closer relationship, thereby ensuring that the act of forcing the portions together does not crush the plastic wall.

The feed-through preferably includes at least one of the following features:

the first portion includes a central peg and the second portion includes a central bore to receive said peg, the peg being surrounded by an abutment surface for engaging the end of the second portion surrounding said bore;

each of said skirts includes a recessed portion on its wall-facing side for receiving the at least one deformable sealing member, and at least a part of each skirt bears lightly on the face of the wall;

said deformable sealing member comprises a single grommet fitted round the edge of the orifice prior to forcing the first and second portions together;

said at least one deformable sealing member comprises a pair of sealing rings, each of which is compressed between the skirt of a respective one of the first and second members and the facing surface of the wall.

BRIEF DESCRIPTION OF THE DRAWINGS

Two embodiments of the invention are described by way of example with reference to the accompanying drawings, in which.

MORE DETAILED DESCRIPTION

Figure 1:
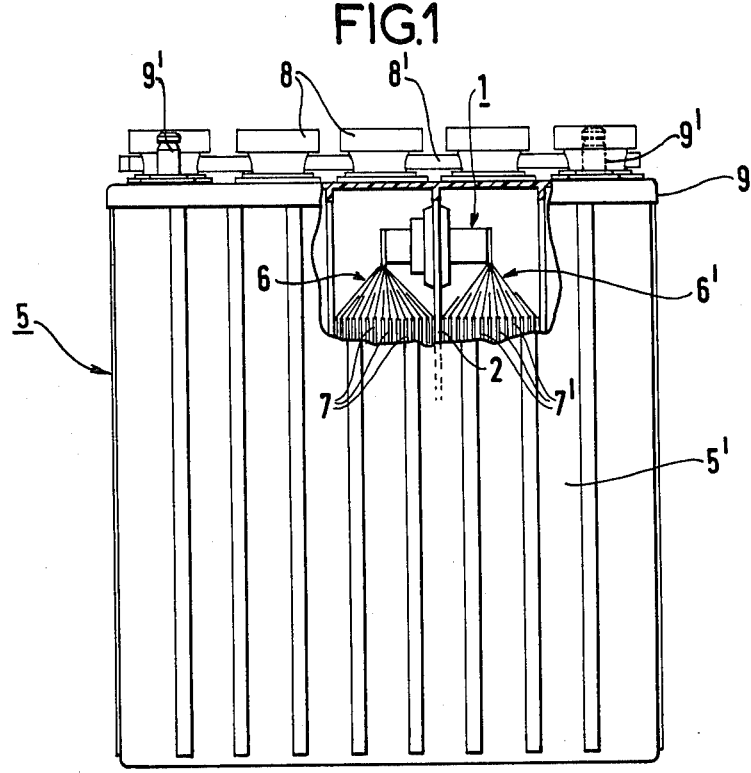
FIG. 1 is a partially cut-away side view of a five-cell battery unit.

In FIG. 1, a battery unit 5 comprises a monobloc casing 5' cast in plastic material and having five compartments for housing five cells 4 which are separated from one another by four internal partition walls 2 integrally cast with the casing 5'. A feed-through 1 passes through each internal partition wall 2 below the electrolyte level in the battery. Such positioning minimizes total battery height, but it requires the feed-thoughs to be sealed.

On either side of each feed-through, ie. in each cell 4, a plurality of plate heads 6 or 6' connect the feed-through to a corresponding number of electrodes 7 and 7'. The plate heads are welded to the component parts of the feed-through before insertion into the battery casing. Each assembly of a feed-through component part connected via the plate heads 6 or 6' to the electrodes 7 or 7' is then inserted into a corresponding compartment in the casing 5', and mating feed-through component parts are interconnected by a force fit into each other via a corresponding orifice in the intervening partition wall.

A cover 9 is fitted on the monobloc casing 5' and has five stoppers 8 for filling the battery cells. To enable rapid filling, the stoppers 8 are interconnected by a pipe 8'.

Figure 2:
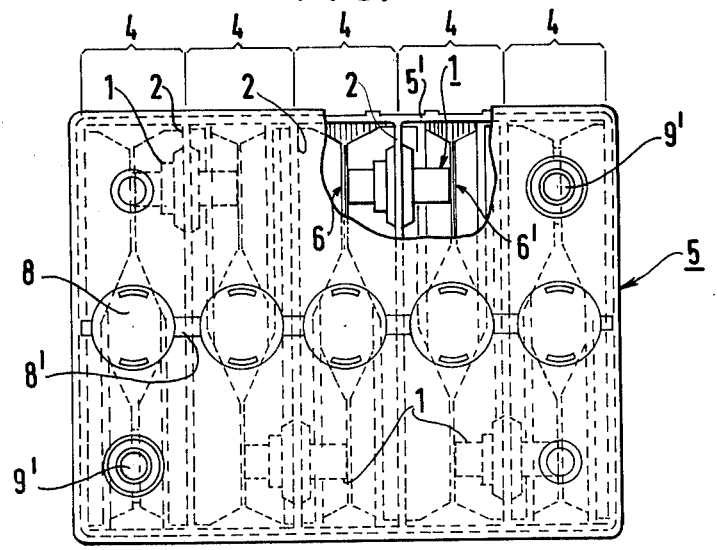
FIG. 2 is a partially cut-away plan view of the FIG. 1 battery unit.

FIG. 2 shows how the five cells 4 are interconnected in series by four feed-throughs 1 passing through the four partition walls 2. It also shows two external terminals 9' for the battery unit as a whole.

Figure 3A:
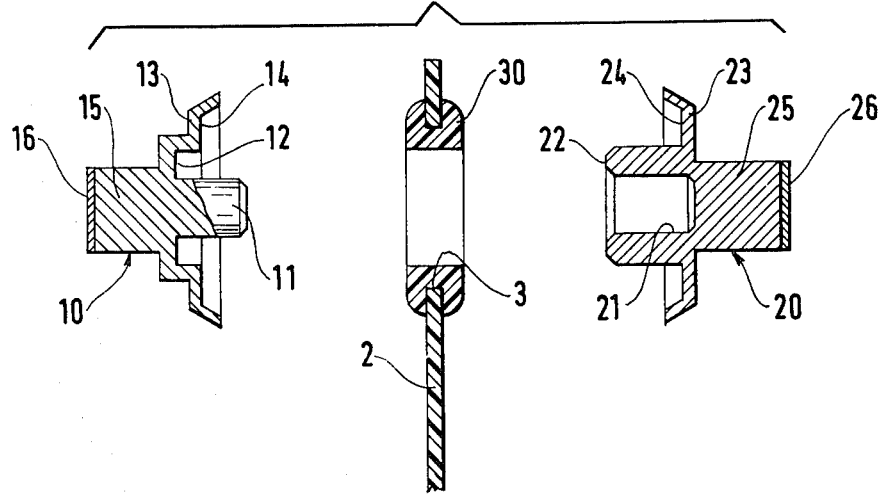
FIG. 3A is a section through an exploded feed-through showing the placement of a single sealing grommet.

FIG. 3A is an exploded view of a first feed-through embodying the invention. The figure shows a feed-through comprising a male portion 10, a female portion 20, and a sealing grommet 30 which is fitted in an orifice 3 through a partition wall 2 between two adjacent cells.

The male portion 10 is cylindrical and comprises a main body 15 having a cylindrical peg 11 and a surrounding bell-shaped skirt 13 both of which project towards the wall 2. There is a first annular stop 12 surrounding the peg 11, and a joggle in the skirt 13 provides a second annular stop 14 surrounding the first stop 12. The opposite end of the body 15 has a face 16 for welding to the plate heads.

The female portion 20 is also cylindrical and comprises a main body 25 having a bore 21 facing the wall 2 and a surrounding bell-shaped skirt 23 corresponding to the skirt 13 of the male portion. The skirt 23 includes a stop 24 corresponding to the stop 14, and the opposite end of the body 25 has a face 26 for welding to the plate heads.

Figure 3B:
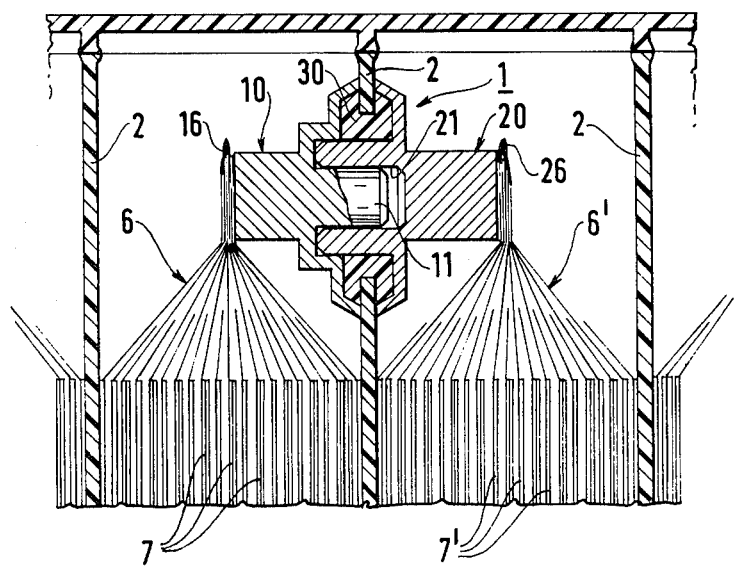
FIG. 3B is a section through the assembled FIG. 3A feed-through fitted in a partition wall separating two cells.

FIG. 3B shows the same feed-through after it has been assembled in the orifice 3.

The peg 11 is the male part which is received in the bore 21 of the female portion 25. The end 22 of the female portion abuts against the first annular stop 12 of the male portion.

The grommet 30 is sandwiched between the bell-shaped skirts 13 and 23, and in particular is compressed by their respective stops 14 and 24.

The plate heads 6 are connected to electrodes 7 of a first polarity and are welded to the face 16 of the male portion. Likewise the plate heads 6' are connected to electrodes 7' of opposite polarity, but in a different cell, and are welded to the face 26 of the female portion.

The male portion peg 11 is a force fit in the female portion bore 21, thereby providing an electrical connection between adjacent cells, while the grommet 30 which is compressed between the portions' skirts provides sealing to prevent electrolyte leaking from one cell into the next via the orifice 3.

Figure 4A:
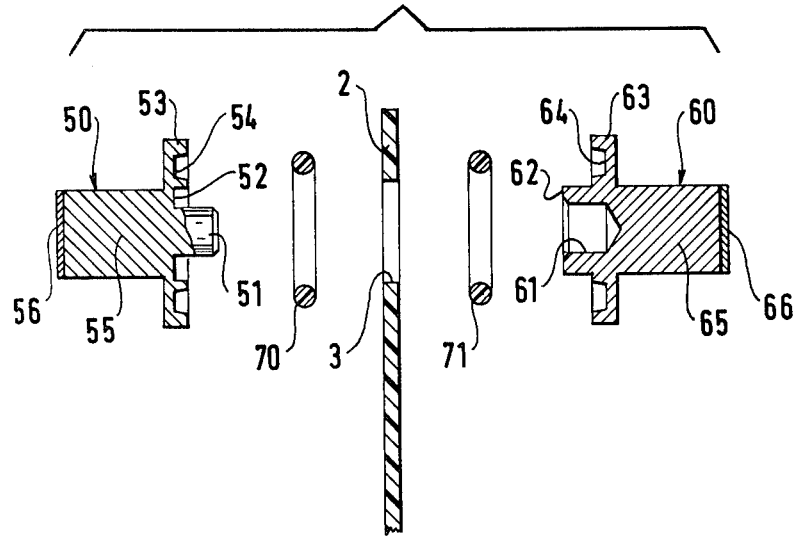
FIG. 4A is a section through an exploded feed-through showing the placement of two sealing rings.

FIG. 4a is an exploded view of a second feed-through embodying the invention. The figure shows a feed-through comprising a male portion 50, a female portion 60 and a pair of sealing rings 70 and 71 for installation on either side of an orifice 3 through a partition wall 2 between two adjacent cells.

The male portion 50 is cylindrical and comprises a main body 55 having a cylindrical peg 51 which projects towards the wall 2, and a surrounding disk-shaped skirt which has an inner and an outer groove in its wall-facing surface. The inner groove constitutes a first annular stop 52 surrounding the peg 51, and the outer groove constitutes a second annular stop 54 surrounding the first stop 12. The opposite end of the body 55 has a face 56 for welding to the plate heads.

The female portion 60 is also cylindrical and comprises a main body 65 having a bore 61 facing the wall 2 and a surrounding disk-shaped skirt 63 corresponding to the skirt 53 of the male portion. The skirt 63 includes a stop 64 in the form of an annular groove and corresponding to the stop 54. The opposite end of the body 65 has a face 66 for welding to the plate heads.

Each of the skirts 53 and 63 receives a respective sealing ring 70, 71 in its groove 54 or 64.

Figure 4B:
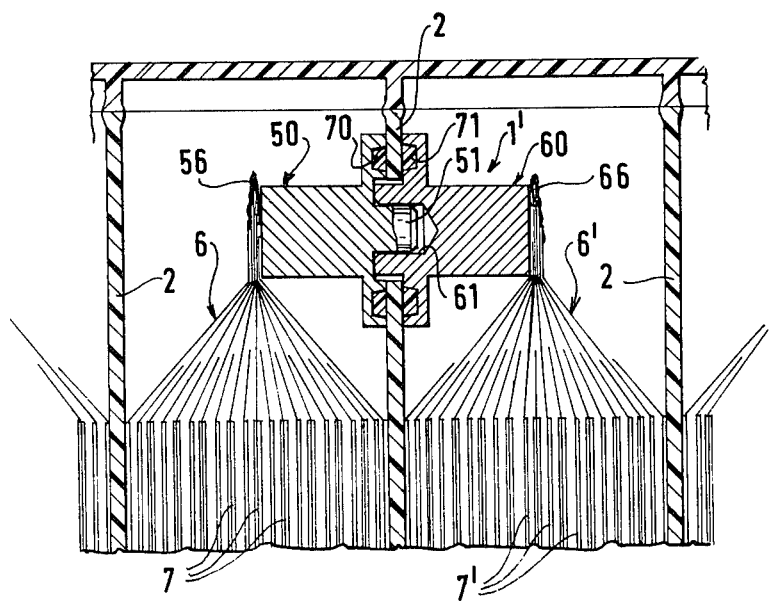
FIG. 4B is a section through the assembled FIG. 4A feed-through fitted in a partition wall separating two cells.

FIG. 4B shows the FIG. 4A feed-through after it has been assembled in the orifice 3.

The peg 51 is the male part which is received in the bore 61 of the female portion 65. The end 62 of the female portion abuts against the first annular stop 52 of the male portion.

The sealing ring 70 is compressed between the outer groove 54 of the disk-shaped skirt 53 and the wall 2. Similarly, the sealing ring 7 is compressed between the groove 64 of the disk-shaped skirt 63 and the opposite face of the wall 2. During assembly the sealing rings 70, 71 are jammed inside their respective grooves to avoid creep.

The plate heads 6 are connected to electrodes 7 of a first polarity and are welded to the face 16 of the male portion. Likewise the plate heads 6' are connected to electrodes 7' of opposite polarity, but in a different cell, and are welded to the face 26 of the female portion.

The male portion peg 51 is a force fit in the female portion bore 61, thereby providing an electrical series connection between adjacent cells, while the pair of sealing rings 70, 71 which are compressed between respective faces of the wall 2 and the adjacent feed-through portions provide sealing to prevent electrolyte leaking from one cell into the next via the orifice 3.

In the arrangements shown in both of FIGS. 3B and 4B, it can be seen that, once the parts have been pushed fully home during assembly, resistance to any further compression is provided by abutment of the metal surfaces of the feed-through portions. This ensures that the wall 2 is not crushed, in spite of being made of a plastic material which is much softer than the feed-through.

A pneumatic or hydraulic power tool may thus be used to force the feed-through portions together, eg. by lowering pincer blades on either side of the wall 2 from its top edge and then urging the blades together.

The invention is not limited to the specific embodiments shown and described, and in particular, the feed-through may be located above the equilibrium level of the electrolyte (it still needs to be sealed against overfilling and splashing). Naturally the number of cells in a battery unit is immaterial to the present invention so long as there are at least two cells to be electrically interconnected through a partition wall.

We claim:

1. A sealed feed-through for interconnecting two cells of an alkaline storage battery by passing through a wall of said battery in a sealed manner, said battery including a monobloc casing of plastic material defining at least two battery cell compartments which are separated by said wall, said wall having an orifice for receiving said feed-through; said feed-through comprising:

a first portion for electrical connection to electrodes of a first polarity in a first of said two cells to be interconnected by means of the feed-through; and a second portion for electrical connection to electrodes of a second, opposite, polarity in the second of said two cells to be interconnected by means of the feed-through;

the improvement wherein said first and second portions include interfitting male and female portions suitable for passing through said orifice from opposite sides thereof and for engaging each other in a force fit;

wherein said first and second portions further include respective skirts surrounding said interfitting portions and serving to compress at least one deformable sealing member around said orifice; and wherein said first and second portions include interacting abutment surfaces to define a fully-home position in which the portions are prevented from moving into closer relationship, thereby ensuring that the act of forcing the portions together does not crush the plastic wall.

2. A feed-through according to claim 1, wherein the first portion includes a central peg and the second portion includes a central bore to receive said peg, the peg being surrounded by an abutment surface for engaging the end of the second portion surrounding said bore.

3. A feed-through according to claim 1, wherein each of said skirts includes a recessed portion on its wall-facing side for receiving the at leat one deformable sealing member, and wherein at least a part of each skirt bears lightly on the face of the wall.

4. A feed-through according to claim 1, wherein said deformable sealing member comprises a single grommet fitted round the edge of the orifice prior to forcing the first and second portions together.

5. A feed-through according to claim 1, wherein said at least one deformable sealing member comprises a pair of sealing rings, each of which is compressed between the skirt of a respective one of the first and second members and the facing surface of the wall.

* * * * *